United States Patent
Jones et al.

(10) Patent No.: US 7,289,533 B2
(45) Date of Patent: Oct. 30, 2007

(54) UNIVERSAL SUBSCRIBER COMMUNICATOR MODULE

(75) Inventors: Mark Jackson Jones, San Diego, CA (US); William Richard Garmer, San Diego, CA (US)

(73) Assignee: Quake Global, Inc., San Diego, CA (US)

(*) Notice: Subject to any disclaimer, the term of this patent is extended or adjusted under 35 U.S.C. 154(b) by 226 days.

(21) Appl. No.: 10/455,855

(22) Filed: Jun. 6, 2003

(65) Prior Publication Data

US 2005/0002344 A1   Jan. 6, 2005

(51) Int. Cl.
*H04J 3/16* (2006.01)

(52) U.S. Cl. ............... 370/466; 342/357.13; 455/550.1

(58) Field of Classification Search ............... 370/265, 370/326, 482; 342/357.12, 357.13, 357.16
See application file for complete search history.

(56) References Cited

U.S. PATENT DOCUMENTS

| | | | | |
|---|---|---|---|---|
| 5,572,246 | A * | 11/1996 | Ellis et al. ..................... | 725/22 |
| 6,104,338 | A * | 8/2000 | Krasner ................. | 342/357.06 |
| 6,107,960 | A * | 8/2000 | Krasner ................. | 342/357.09 |
| 6,243,648 | B1 * | 6/2001 | Kilfeather et al. .......... | 701/213 |
| 6,687,609 | B2 * | 2/2004 | Hsiao et al. ................ | 701/207 |
| 6,707,422 | B2 * | 3/2004 | Sheynblat et al. ..... | 342/357.12 |
| 6,762,714 | B2 * | 7/2004 | Cohen et al. .......... | 342/357.12 |
| 2002/0098864 | A1 * | 7/2002 | Mukai et al. ................ | 455/552 |
| 2003/0101343 | A1 * | 5/2003 | Eaton et al. ................ | 713/170 |
| 2003/0174839 | A1 * | 9/2003 | Yamagata et al. .......... | 380/270 |
| 2003/0224761 | A1 * | 12/2003 | Goto ....................... | 455/412.1 |
| 2003/0233189 | A1 * | 12/2003 | Hsiao et al. ................ | 701/207 |

* cited by examiner

*Primary Examiner*—Chi Pham
*Assistant Examiner*—Kevin Mew
(74) *Attorney, Agent, or Firm*—Edward W. Callan

(57) ABSTRACT

A subscriber communicator module and an external data storage device perform the functions of receiving RF communication signals, converting the received RF signals to received digital output samples and converting digital input samples to RF communication signals for transmission; transforming the digital output samples to digital output data and transforming digital input data to the digital input samples; and processing the digital data in accordance with ORBCOMM data protocols. The module includes at least an RF section for performing the receiving and conversion functions. The external data storage device contains software for implementing performance of the transformation functions and/or the data processing function by one or more sections of the subscriber communicator that are not included in the module. Preferably, the module also includes a transformation section and a control processing section, in which the only communication activities provided in accordance with ORBCOMM data protocols are reports and/or user commands.

2 Claims, 2 Drawing Sheets

UNIVERSAL SUBSCRIBER COMMUNICATOR MODULE

BACKGROUND OF THE INVENTION

The present invention generally pertains to telecommunications and is particularly directed to subscriber communicators.

One subscriber communicator known as the ORBCOMM subscriber communicator is adapted for use in the ORBCOMM Satellite communication network. The ORBCOMM network includes twenty-eight low-earth-orbit (LEO) communication satellites, gateway Earth stations, network control centers and a global network operations center in Dulles, Va. The ORBCOMM network provides wireless, two-way global satellite data communications between mobile subscriber communicators and operators via the Internet or dedicated leased lines for high-volume operations. ORBCOMM downlink signals are provided in a symmetrical differential phase-shift-keyed (SDPSK) format at 4800 bps in receive frequency range between 137.0 and 138.0 MHz. ORBCOMM uplink signals are provided in a SDPSK format at 2400 bps in transmit frequency range between 148.0.0 and 150.05 MHz.

The ORBCOMM subscriber communicator includes an RF section for receiving RF communication signals, for converting the received RF signals to digital output samples and for converting digital input samples to RF communication signals for transmission; a transformation section for transforming the digital output samples to digital output data and for transforming digital input data to the digital input samples; and a control processing section for processing digital data in accordance with ORBCOMM data protocols to provide a plurality of communication activities that facilitate various user applications, such as telematics, industrial controls, and set-top boxes.

Each of the RF section, the transformation section and the control processing section includes both hardware and software elements. The transformation section includes a digital signal processor (DSP). The processing section typically includes a multi-functional microprocessor, such as a Motorola 68040. The performance of each of these three sections is implemented by software. All three of these sections and the respective implementing software are contained in one module.

SUMMARY OF THE INVENTION

The module-and-data-recording-device combination of the present invention can readily be adapted for use in a subscriber communicator that processes digital data in accordance with ORBCOMM data protocols, non-ORBCOMM data protocols, or both such data protocols, and thereby is capable of universal application.

The present invention also provides a subscriber communicator module that performs the functions of receiving RF communication signals, converting the received RF signals to received digital output samples and converting digital input samples to RF communication signals for transmission; transforming the digital output samples to digital output data and transforming digital input data to the digital input samples; and processing the digital data in accordance with ORBCOMM data protocols to provide a plurality of communication activities, the module comprising: an RF section for performing the receiving and conversion functions; and a transformation section coupled to the RF section for performing the transformation functions; and a control processing section coupled to the transformation section for performing the data processing function in accordance with a limited portion of the ORBCOMM protocols; wherein the communication activities provided by the control processing section in accordance with the limited portion of the ORBCOMM data protocols include at least reports and/or user commands.

Additional features of the present invention are described with reference to the detailed description of a number of alternative preferred embodiments.

DETAILED DESCRIPTION

Figure 1:
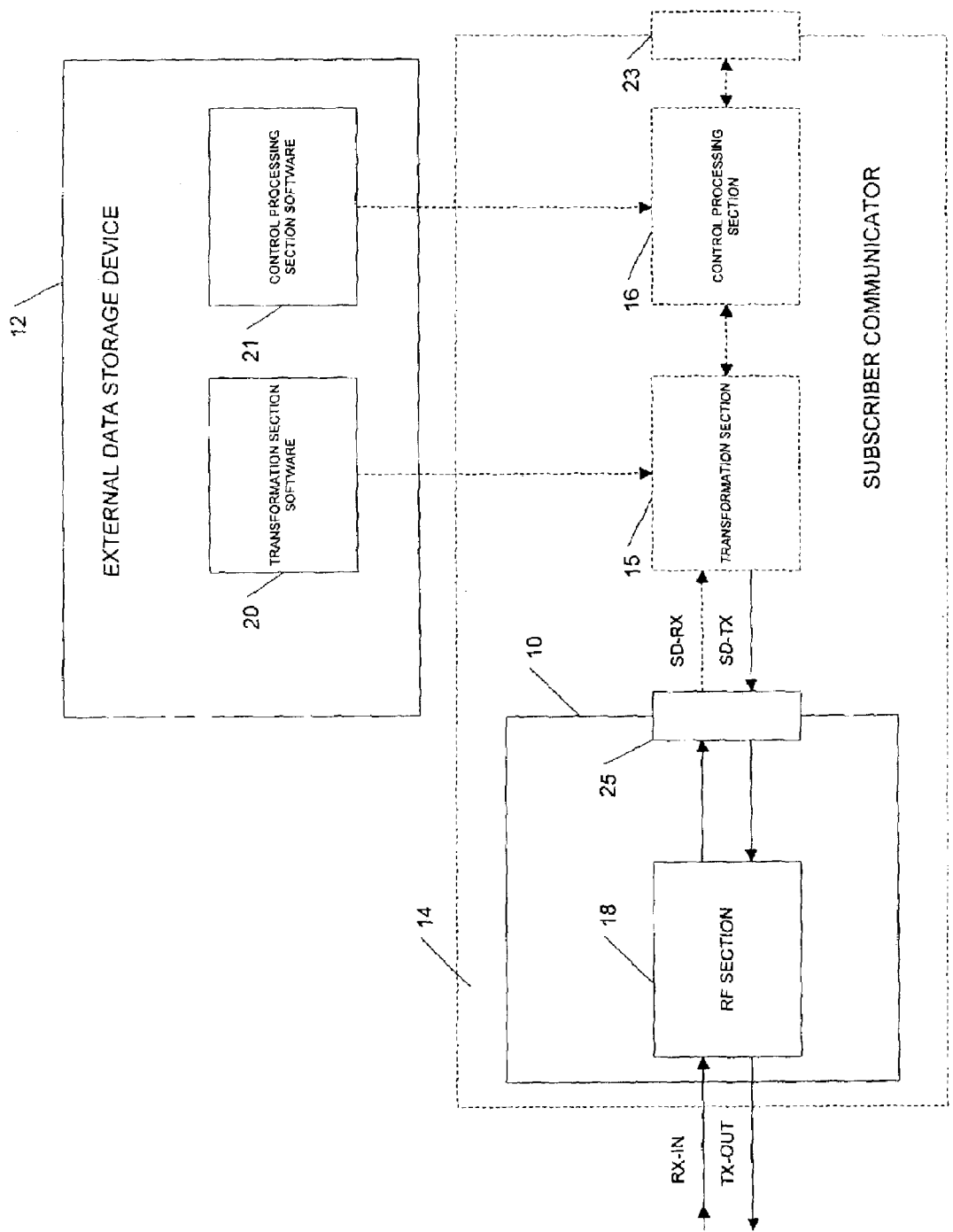
FIG. 1 is a block diagram of one embodiment of the present invention.

FIG. 1 illustrates one embodiment of a combination of a module 10 and an external data storage device 12 for use in a subscriber communicator 14 (shown in dashed lines). The subscriber communicator 14 also includes a transformation section 15 and a control processing section 16, neither of which is included in the module 10.

The module 10 includes an RF section 18 for performing the receiving and conversion functions. The RF section 18 includes a receive channel and a transmit channel. The receive channel downconverts and demodulates received RF communication signals RX-IN to provide received analog components at baseband and processes the received analog components to provide digital output samples SD-RX. The transmit channel processes digital input samples SD-TX to provide input analog modulation components and upconverts and combines the input analog modulation components to provide RF communication signals TX-OUT for transmission.

The external data storage device 12 contains both transformation section software 20 and control processing section software 21. The transformation section software 20 implements performance of the signal transformation function by the transformation section 15 of the subscriber communicator 14; and the control processing section software 21 implements performance of the data processing function by the control processing section 16 of the subscriber communicator 14. The transformation section software 20 and the control processing section software 21 contained in the external data storage device 12 can be installed in any digital platform with the necessary processing power and memory to support ORBCOMM communications.

Preferably, the external data storage device 12 is a compact disc (CD).

In the subscriber communicator 14, with which this embodiment of the combination of the module 10 and the external data storage device 12 is used, the control processing section 16 is coupled to and between the transformation section 15 and a user interface 23; and the control processing section 16 processes digital data in accordance with ORBCOMM data protocols, non-ORBCOMM data protocols, or both such data protocols.

The module 10 also includes an interface section 25 with specific mechanical and electrical interfaces for enabling the RF section 18 to be interfaced with the transformation section 15 of the subscriber communicator 14.

Figure 2:
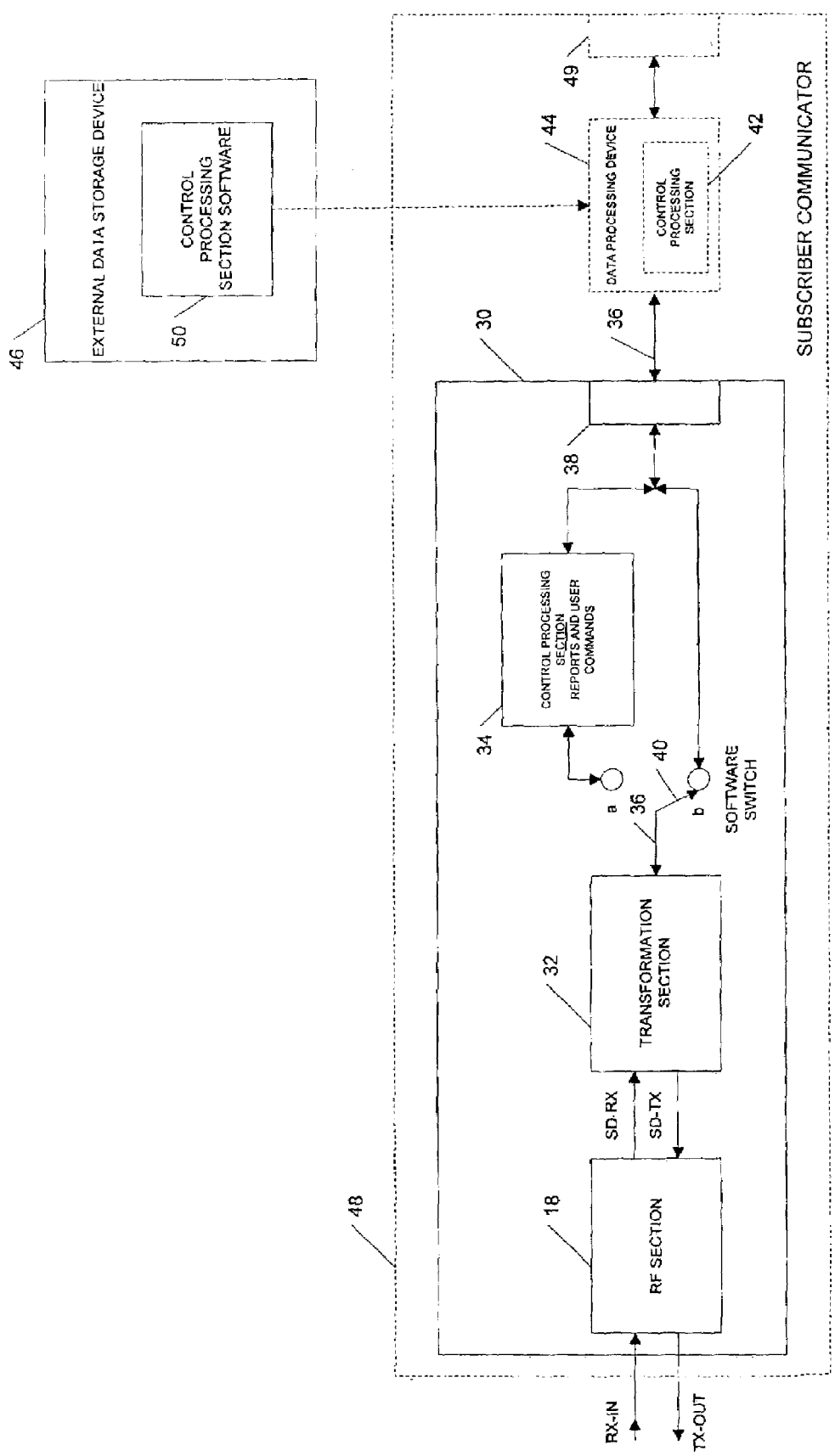
FIG. 2 is a block diagram of another embodiment of the present invention.

The present invention can reduce the costs of a subscriber communicator, such as an ORBCOMM subscriber communicator, in that the module need contain only those elements that are required for the specific application for which the subscriber communicator is intended. For example, FIG. 2 illustrates a preferred embodiment of a subscriber communicator module 30 that can function as a complete ORBCOMM subscriber communicator which provides communication activities in accordance with only a limited portion of the ORBCOMM protocols.

The module 30 includes an RF section 18 for performing the receiving and conversion functions, a transformation section 32 coupled to the RF section 18 for performing the transformation functions and a control processing section 34 coupled to the transformation section for performing the data processing function. The RF section 18 is as described above with reference to FIG. 1.

The transformation section 32 transforms the digital output samples SD-RX to digital output data, which are provided in a serial data stream 36, and transforms digital input data in the serial data stream 36 to the digital input samples SD-TX.

The control processing section 34 processes digital data in accordance with only a limited portion of the ORBCOMM data protocols to provide at least reports and user commands. The limited portion of the ORBCOMM data protocols does not include all of the ORBCOMM data protocols. In the preferred embodiment, only reports and/or user commands are provided by the control processing section 34 in accordance with ORBCOMM data protocols. In alternative embodiments, the limited portion of the ORBCOMM data protocols is more extensive so that, in addition to providing reports and/or user commands, the control processing section 34 can also provide other communication activities in accordance with ORBCOMM data protocols. In other alternative embodiments, in addition to providing communication activities in accordance with the limited portion of the ORBCOMM data protocols, the control processing section 34 also provides other communication activities in accordance with non-ORBCOMM data protocols.

The module 30 further includes a serial data interface 38 and a switch 40. The interface 38 is in accordance with an industry standard data interface, such as RS-232.

The switch 40 enables the serial data interface 38 to be selectively coupled to either (a) the control processing section 34 for use as a user interface, when the switch 40 is in position "a", or (b) the transformation section 32 for enabling the transformation section 32 to be coupled to a control processing section 42 contained within an external data processing device 44, when the switch is in position "b". The control processing section 42 is not included in the module 30.

The control processing section 42 is adapted for performing the processing function in accordance with a more extensive portion of the ORBCOMM data protocols that includes the limited portion and an additional portion of the ORBCOMM data protocols. Preferably the more extensive portion includes all of the ORBCOMM data protocols.

When the switch 40 is in the "b" position and the module 30 is coupled via the interface 38 with the external control processing section 42, the module 30 is combined with an external data storage device 46 that is adapted for use in a subscriber communicator 48 (shown in dashed lines) that also includes the external control processing section 42. A user interface 49 is coupled to the external control processing section 42.

The external data storage device 46 contains control processing section software 50. The control processing section software 50 implements performance of the data processing function by the external control processing section 42 of the subscriber communicator 48. The control processing section software 50 contained in the external data storage device 46 can be installed in any digital platform with the necessary processing power and memory to support ORBCOMM communications. Preferably, the external data storage device 32 is a CD.

The benefits specifically stated herein do not necessarily apply to every conceivable embodiment of the present invention. Further, such stated benefits of the present invention are only examples and should not be construed as the only benefits of the present invention.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

The invention claimed is:

1. A subscriber communicator module that performs the function of receiving RF communication signals, converting the received RF signals to received digital output samples and converting digital input samples to RF communication signals for transmission; transforming the digital output samples to digital output data and transforming digital input data to the digital input samples; and processing the digital data in accordance with ORBCOMM data protocols to provide a plurality of communication activities, the module comprising:

an RF section for performing the receiving and conversion functions; and a transformation section coupled to the RF section for performing the transformation functions; and a control processing section coupled to the transformation section for performing the data processing function in accordance with a limited portion of the ORBCOMM protocols;

wherein the communication activities provided by the control processing section in accordance with the limited portion of the ORBCOMM data protocols includes at least reports and user commands; and a serial data interface; and means for enabling the serial data interface to be selectively coupled to either (a) the control processing section for use as a user interface or (b) the transformation section for enabling the transformation section to be coupled to an external data processing device that is adapted for performing the processing function in accordance with a more extensive portion of the ORBCOMM data protocols that includes the limited portion and an additional portion of the ORBCOMM data protocols.

2. A module according to claim 1, in combination with an external data storage device that contains software for implementing performance of the data processing function by said external data processing device.

* * * * *